(12) United States Patent
Renson (10) Patent No.: US 12,546,504 B2
(45) Date of Patent: Feb. 10, 2026

(54) VALVE ASSEMBLY FOR AN AIR DUCT

(71) Applicant: Prado Europe bv, Nieuwpoort (BE)

(72) Inventor: Thibault Louis Renson, Nieuwpoort (BE)

(73) Assignee: Prado Europe bv, Nieuwpoort (BE)

( * ) Notice: Subject to any disclaimer, the term of this patent is extended or adjusted under 35 U.S.C. 154(b) by 532 days.

(21) Appl. No.: 17/758,942

(22) PCT Filed: Jan. 18, 2021

(86) PCT No.: PCT/EP2021/050959
§ 371 (c)(1),
(2) Date: Jul. 15, 2022

(87) PCT Pub. No.: WO2021/144470
PCT Pub. Date: Jul. 22, 2021

(65) Prior Publication Data
US 2023/0050311 A1    Feb. 16, 2023

(30) Foreign Application Priority Data

Jan. 16, 2020 (EP) ..................................... 20152161
Jan. 17, 2020 (NL) ..................................... 2024689

(51) Int. Cl.
*F24F 13/12*    (2006.01)
*F24F 13/078*   (2006.01)
(Continued)

(52) U.S. Cl.
CPC .......... *F24F 13/12* (2013.01); *F24F 2221/02* (2013.01)

(58) Field of Classification Search
CPC ....... F24F 2221/02; F24F 13/078; F24F 13/12
See application file for complete search history.

(56) References Cited

U.S. PATENT DOCUMENTS 2,962,582 A    11/1960   Croft
4,142,227 A *  2/1979    Aikens ................... F24F 13/078
                                                          362/373
(Continued)

FOREIGN PATENT DOCUMENTS

DE    19641902 A1    4/1998
EP     2492606 A1    8/2012
(Continued)

OTHER PUBLICATIONS

ISR-WO dated 06-Apr. 2021 for parent application PCT/EP2021/050959.

*Primary Examiner* — Steven S Anderson, II
(74) *Attorney, Agent, or Firm* — Vorys, Sater, Seymour and Pease LLP (57) ABSTRACT

The present invention relates to a valve assembly (1) for an air duct for ventilation of a building, comprising a valve (10; 100), a housing (40), and an electrical body (20) provided within said housing. The valve (10, 100) comprises adjustment means to adjust the position of flow regulating means (113, 126) of the valve (10; 100), wherein the position of the flow regulating means (113, 126) is configured to adjust the size of a gap (50) between the valve (10; 100) and the outer circumference at the distal end of the electrical body (20), regulating a flow or pressure of air flowing through the valve (10; 100), wherein the size of the gap (50) is measured perpendicular to the outer circumference as the smallest distance from the distal end of the electrical body (20) to the flow regulating means (113, 126) of the valve (10; 100).

16 Claims, 10 Drawing Sheets

(51) Int. Cl.
*F24F 13/10* (2006.01)
*F24F 13/14* (2006.01)

(56) References Cited

U.S. PATENT DOCUMENTS

| | | | |
|---|---|---|---|
| 8,297,804 B2 * | 10/2012 | Buse | ........................ F21V 21/14 |
| | | | 362/372 |
| 8,757,201 B2 | 6/2014 | Borander | |
| 9,045,235 B2 * | 6/2015 | Rittner | ................... B64D 13/00 |
| 2006/0052049 A1 | 3/2006 | Caldwell et al. | |
| 2013/0266443 A1 | 10/2013 | Yang et al. | |

FOREIGN PATENT DOCUMENTS

| | | | | |
|---|---|---|---|---|
| FR | 2331755 A1 | 6/1977 | | |
| SE | 430101 B | 10/1983 | | |
| WO | 2012174155 | 12/2012 | | |
| WO | WO-2015194960 A1 * | 12/2015 | ............ | F24F 13/078 |
| WO | 2021144470 A1 | 7/2021 | | |

\* cited by examiner

VALVE ASSEMBLY FOR AN AIR DUCT

FIELD OF THE INVENTION

The present invention relates to an adjustable valve assembly suitable for mounting in or to an air duct for forced or unforced ventilation of a home and the like. The present invention further relates to a method for controlling air flow or air pressure in an air duct for ventilation of a building.

BACKGROUND

Many buildings have air ducts which provide passages for exchange, ventilation, circulation and/or movement of air through the surfaces (e.g. walls and ceilings) of the building. Buildings may have ventilation systems, which take in "fresh" air from outside of the building and expel "exhaust" air from inside the building. Fresh air may be taken into a building or exhaust air may be expelled from a building through one or more air ducts. Some buildings incorporate other systems and/or apparatus, such as air conditioning systems, heating systems and bathroom fans, which use air ducts to provide routes for the movement of air through building surfaces.

Typically, an air duct is associated with a valve which connects the air duct with a room of the building. A valve provides a passageway in fluid communication with its associated air duct to provide a means for air flow through a building surface. Some valves comprise flow adjustment mechanisms. Such mechanisms allow the flow of air through the valve to be controlled. The valve may comprise a cover for providing a more aesthetically pleasing view of a user.

EP2492606A1 relates to an air flow adjustment device for arrangement in an air ventilation arrangement, wherein the device comprises an outer tube, an inner tube arranged inside the outer tube and rotationally and axially moveable relative to the outer tube, and a twist tube with an axial opening through which air is adapted to flow. The outer tube (10) comprises a helical slot (13), and the inner tube (20) is provided with an adjustment handle (24) that extends radially through the helical slot (13) of the outer tube.

US2006052049A1 relates to a diffuser cartridge of restricted height is provided for controlling flow of air in an air conditioning system. The cartridge has two axially aligned temperature sensitive elements for respectively sensing room temperature and duct temperature variations. Arms are provided for displacing an air flow baffle and a control structure is provided for displacing the arms in response to sensed room and duct temperatures. The control structure pivots the arms cam-fashion as it is moved vertically by the temperature sensitive elements. The control structure has two springs that act in series to counter movement of the control structure by the temperature sensitive elements. The springs are nested coaxially within each other, with an intermediate component transferring compressive loads from one spring to the other. The control structure has control elements that are independently movable to adjust set points of the diffuser, by moving collars with cam surfaces, vertically.

U.S. Pat. No. 8,757,201B2 relates to a device for airflow regulation in an air damper is disclosed. The device includes a twist sleeve of flexible material, the cross section of which substantially conforms to an outer tube in which the flow takes place, one end of the twist sleeve being disposed on the inner side of the outer tube and the other end of the twist sleeve being disposed in a tube sleeve which can be rotated under an axial displacement controlled in relation to the rotation. The outer diameter of the tube sleeve is smaller than the inner diameter of the outer tube, so that the tube sleeve slides easily in the outer tube. The tube sleeve is provided with a helical slot. The rotation of the tube sleeve is achieved by a gearwheel adapted to cooperate with the helical slot to pull around the tube sleeve.

GB251714A relates to a ventilating system comprises an inner casing provided at its top with a grid or grating, and a coaxial sleeve, the casing and sleeve having one or more inlet ports adapted to be brought into or out of register by relative movement between the two parts. The grid may be integral with the casing, or it may be separate and secured by screws, or according to a further modification the grid and casing may be screw threaded for engagement. Both casings are usually cylindrical and the inner casing is adapted to be rotated. A perforated removable screen is fitted in the inner casing. A dome may be adjustably mounted on the grid by means of a screw. The appliance is fitted in a wall or floor so that the port is in the path of the flow of air in the shaft or trunk.

OBJECT OF THE INVENTION

An object of the invention is to provide an improved valve, which is manually adjustable when installed in the air duct. Another object of the invention is to provide an assembly of an adjust valve and luminaire body or the like.

SUMMARY OF THE INVENTION

Aspects of the present disclosure are to address at least the abovementioned problems and/or disadvantages and to provide at least the advantages described below. Accordingly, an aspect of the present disclosure is to provide a valve for mounting in or to an air duct for ventilation of a house, the air duct may for example end in the floor or ceiling of a room of the house. The valve is furthermore suitable for use with an air duct for supplying air to the room or an air duct for extracting air to the room. The valve comprises a stator having an annular stator element adapted to be mounted to, preferably retained in, said air duct, an outer rotor part provided in the space defined by the annular stator element, an inner rotor part enclosed in the space between, and connected to, the stator and the outer rotor part. In particular, the inner and outer rotor part are rigidly connected to each other such that turning the outer rotor part causes the rotation of the inner rotor part. Moreover, the outer rotor part may be retained in the space defined by the annular stator element using complementary retaining means, e.g a screw or the like that extends in a respective recessed surface of the outer rotor element to mechanically retain the outer rotor part, and thereby also the inner rotor part, inside the annular stator element.

The valve is further adapted to adjust the axial position of the inner rotor part relative to the outer rotor part, preferably in discrete steps, when the outer rotor part is turned, i.e. is rotated around its central axis A. As such the cross-section of an air passage between the outer rotor part and the inner rotor part is changed causing a change in the flow or pressure of air flowing through the valve.

In this manner, an improved valve, which is manually adjustable when installed in the air duct, is provided. In particular, the described valve is compactly and efficiently designed, and does not require the presence of parts, e.g. a cover, in the room connected to the air duct. However, the valve may be provided partially extending out of the air duct.

According to an embodiment, the present invention relates to the valve as described above, wherein the stator comprises at least one inner slot provided on the inner surface of the stator for receiving and guiding at least one protrusion provided on the outer surface of an annular inner rotor element of the inner rotor part. The at least one inner slot is adapted to adjust the axial position of the inner rotor part relative to the stator and the outer rotor part when the inner rotor part is rotated relative to the stator.

According to another embodiment, the present invention relates to the valve as described above, further comprising visual indications, corresponding to the axial position of the inner rotor part, on the side that is arranged to face towards a room of the house when the valve is retained in the air duct.

Another aspect of the present disclosure is to provide a valve assembly for retaining in or mounting to an air duct for ventilation of a house, the air duct may for example end in the floor or ceiling of a room of the house. The valve assembly is furthermore suitable for use with an air duct for supplying air to the room or an air duct for extracting air to the room. The valve assembly comprises an adjustable valve having adjustment means adapted to regulate the flow or pressure of air flowing through the valve, and having an outer housing side adapted to be rigidly connected to said air duct and an inner housing side, opposite the outer housing side, which is arranged to receive said valve. The valve assembly further comprises an electrical body having an electrical connection adapted to connect a power source to an electronic device. Preferably, the body is configured as a luminaire body that is adapted to receive a light source, e.g. a LED, to provide illumination.

The electrical body is adapted to be connected to the adjustment means of the adjustable valve such that axial rotation of the electrical body, i.e. the rotation of the electrical body around its own axis, regulates the flow or pressure of air flowing through the valve. In other words, by turning or rotating the electrical body around its longitudinal axis, the adjustment means adjust the position of the position of flow regulating means of the valve that regulate the flow or pressure of air flowing through the valve, preferably in a predetermined number of discrete steps. In this manner, a user may manually regulate or set the flow or pressure of air flowing through the valve when the valve assembly is installed in the air duct in a simple manner.

According to an embodiment, the present invention relates to the valve assembly as described above, wherein the position of the electrical body, preferably the luminaire body, with respect to the valve and the housing is manually adjustable via point rotation, i.e. via rotation about exactly one rotation point, wherein said rotation point is defined by the connection means between the valve and the body. Advantageously, the direction of the electrical body may be manually adjust to for example adjust the illumination direction in case the electrical body is a luminaire.

According to yet another embodiment, the present invention relates to the valve assembly as described above, further comprising removable locking means adapted to prevent turning of the outer rotor part.

The removable locking means is adapted to prevent adjustment of the position of the flow regulating means of the valve.

According to a further embodiment, the present invention relates to the valve assembly as described above, wherein the adjustable valve is mechanically retained via an annular coil spring.

According to a preferred embodiments of the invention, the housing has a diameter of approximately 120 mm and/or a height of approximately 70 mm.

In a further aspect the present disclosure is to provide a mechanical ventilation system comprising a ventilation device connected to an air duct in which a valve and/or a valve assembly as described above is provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF DRAWINGS

The invention will be explained in more detail below with reference to drawings in which illustrative embodiments thereof are shown. They are intended exclusively for illustrative purposes and not to restrict the inventive concept, which is defined by the appended claims.

FIG. 8 shows a cross section of a valve assembly in a closed (A) and in a closed and tilted (B) configuration, comprising a gap wherein air is guided through.

FIG. 9 shows a cross section of a valve assembly in an open (A) and in an open and tilted (B) configuration, comprising a gap wherein air is guided through.

DETAILED DESCRIPTION OF EMBODIMENTS

Figure 1:
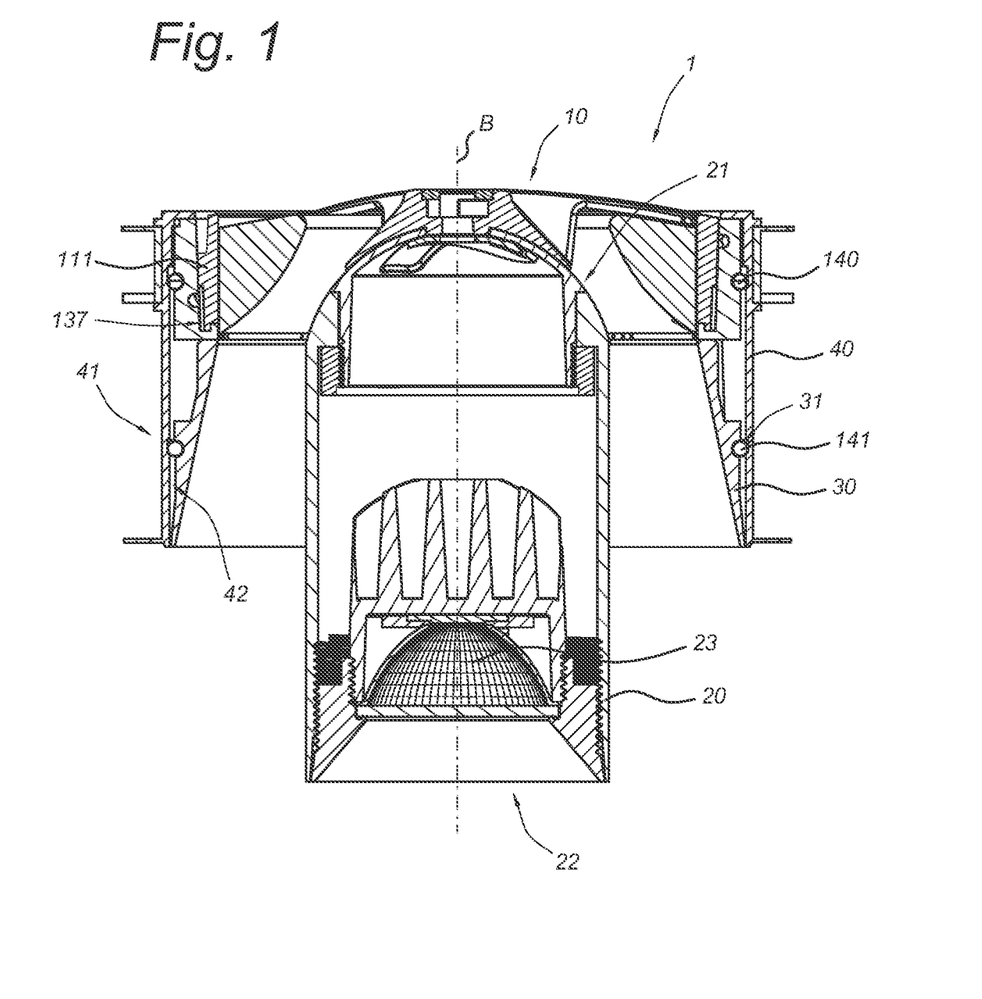
FIG. 1 shows a cross section of a valve assembly according to an embodiment of the invention.
Figure 2:
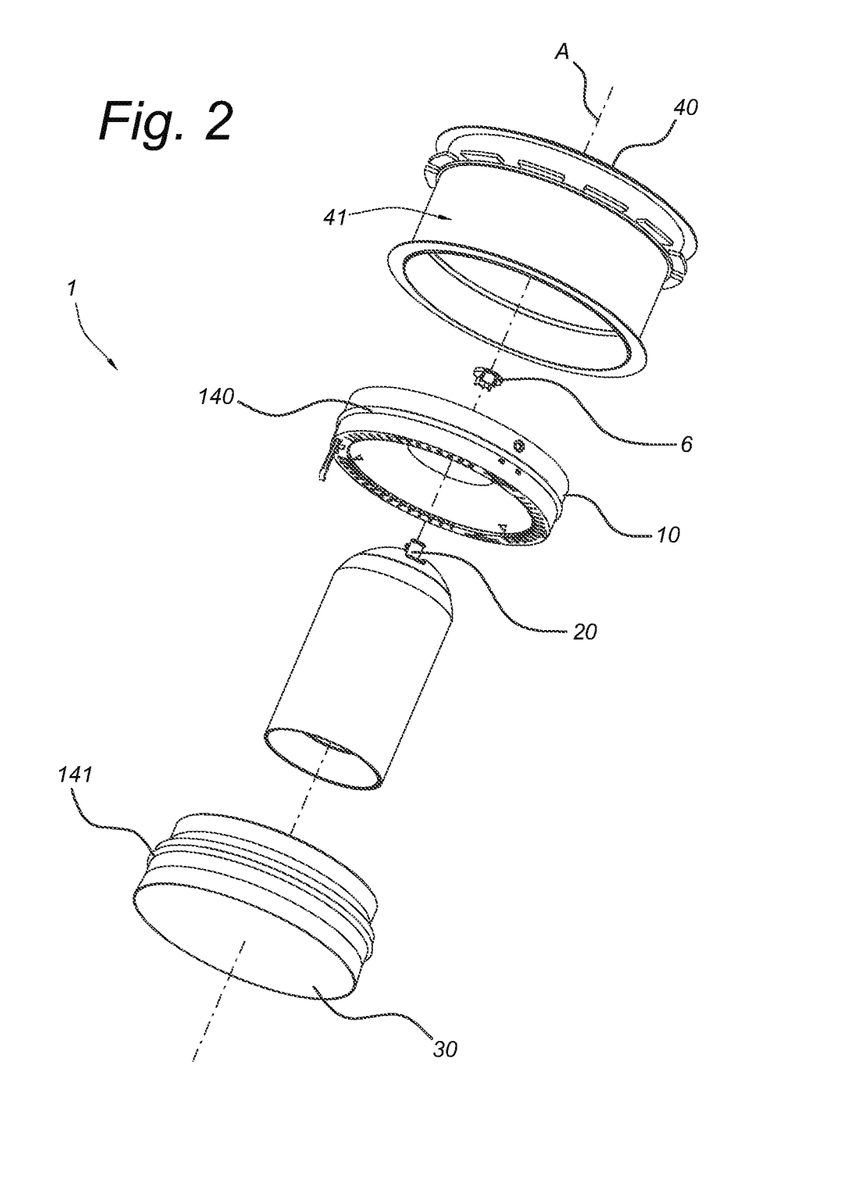
FIG. 2 shows in exploded view the valve assembly shown in FIG. 1.

FIGS. 1 and 2 show a valve assembly 1 for use in an air duct of a mechanical or natural ventilation system of a house or the like. The shown valve assembly 1 comprises an annular housing 40 in which an adjustable valve 10 of the valve assembly 1 is mechanically retained via an annular coil spring 140. The valve assembly 1 further comprises a luminaire 20, 23 connected to and extending from a side of the valve 10 which is arranged to face towards a room of the house, in which the air duct debouches, when the housing 40 is attached to an inner wall of the air duct.

Figure 7A:
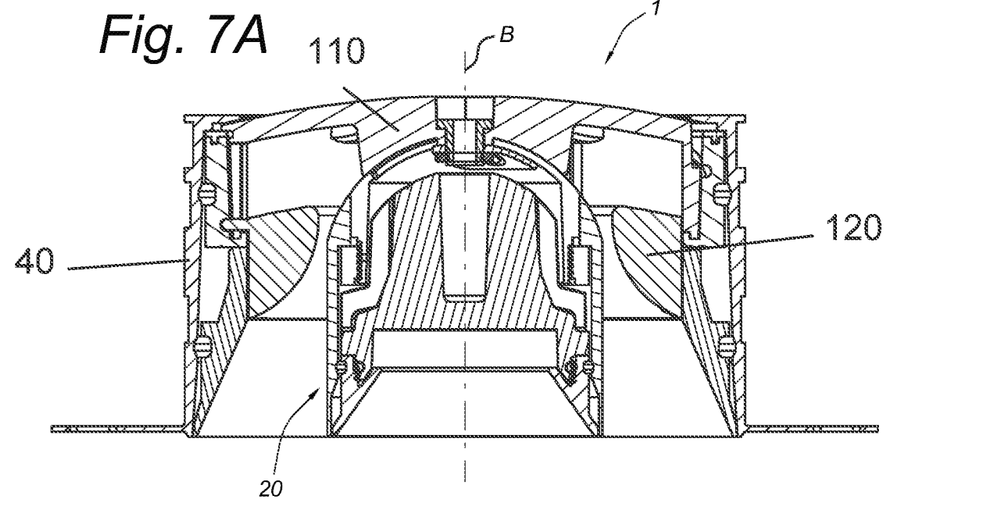
FIG. 7A shows a cross section of a valve assembly according to an embodiment of the invention.
Figure 7B:
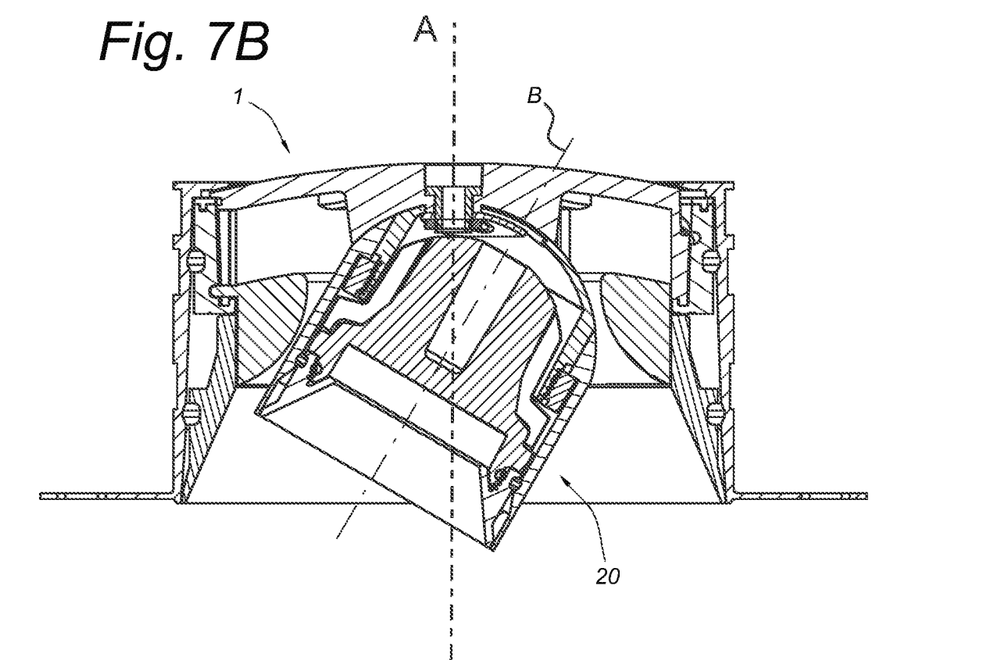
FIG. 7B shows a cross section of a valve assembly according to an embodiment of the invention.

The housing 40 has an outer housing side 41 adapted to be connected to said air duct and an inner housing side 42, opposite the outer housing side 41, which is adapted to be connected to the adjustable valve 10. The valve 10 comprises adjustment means and flow regulating means for regulating the flow or pressure of air flowing through the housing 40 based on the position of the adjustment means. The luminaire 20, 23 comprises a luminaire body 20 adapted to be connected to said adjustment means for adjusting the position of the adjustment means thereby regulating the flow or pressure of air flowing through the housing 40, and arranged towards the room when the housing 40 is attached to an inner wall of the air duct. The proximal end 21 of the luminaire body 20 is adapted to be rotationally connected to the adjustment means such that axial rotation of the luminaire body 20 modifies the position of the adjustment means and point rotation of the luminaire body 20 modifies the direction of the luminaire body B relative to the valve 10 without changing the position of the adjustment means, as shown in FIGS. 7A and 7B. The distal end 21, opposite the proximal end 22, of the luminaire body 20 is adapted to receive and connect to a light source 23, e.g. a LED, via an electrical connection adapted to be connected to a power source.

Furthermore, when in the flow direction the housing 40 is larger than the valve 10, the valve assembly 1 may comprise an annular guide element 30 to guide the air from the end of the housing facing towards a room to the opening in the end of the valve facing towards a room. Similarly to the valve 10, the guide element 30 may be mechanically retained via an annular coil spring 31.

The annular coil springs 140, 141 are adapted to be provided in an annular slot 31, 134 of the valve 10 or guide element 30 to fasten (latch, lock, and hold) the respective part to the housing 40. For example, the coil springs may be compression springs and/or canted coil springs. Advantageously, the coil spring 140, 141 produces a radial or axial force such that the coil spring 31, 140 remains in contact with the mating surface and may compensate for large mating tolerances, alignment, and surface irregularities.

FIGS. 3, 4A-B, 5A-B and 6A-B show an adjustable valve 100 for use in an air duct of a mechanical or natural ventilation system of a house or the like. The adjustable valve 100 comprises a stationary part 130, also called stator, adapted to be stationary connected to said air duct, and a rotatable assembly 110, 120, also called rotor, rotationally connected to said stator 130. The rotatable assembly comprising an inner rotor part 120 and an outer rotor part 110.

Figure 4A:
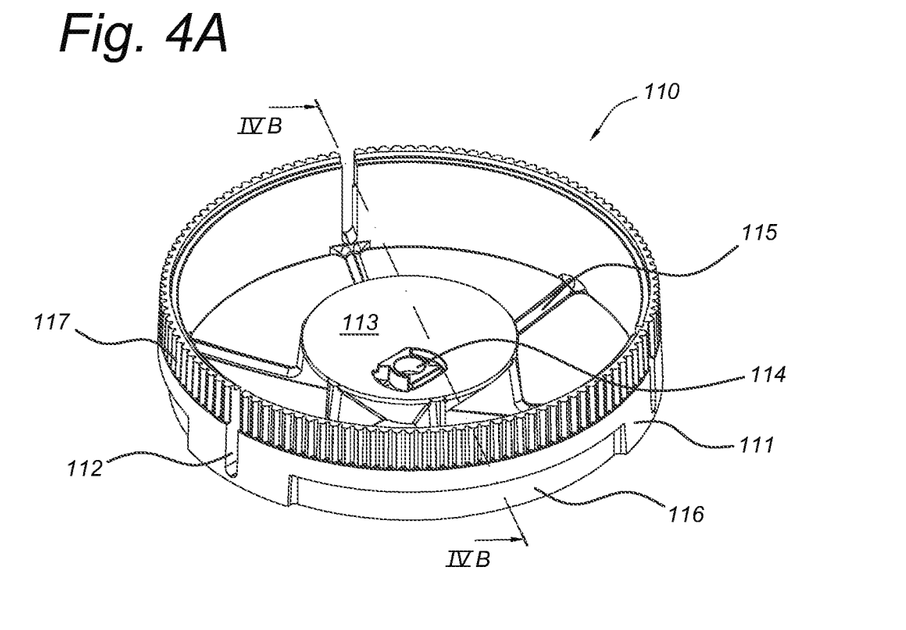
FIG. 4A shows in a perspective view the outer rotor part of the valve shown in FIG. 3.
Figure 4B:
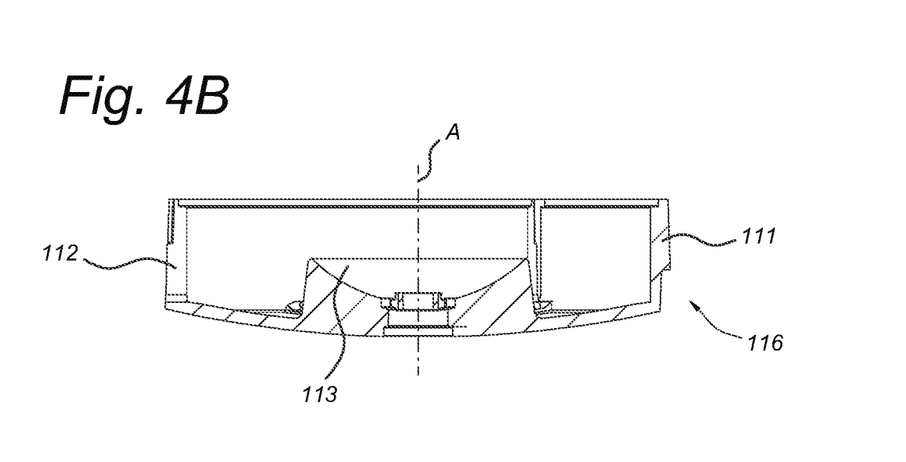
FIG. 4B shows in a cross-sectional view the outer rotor part of the valve shown in FIG. 4A.

As shown in FIGS. 4A-B, the outer rotor part 110 is formed by an annular outer rotor element 111 connected to a central bowl-shaped element 113 via a plurality of spacers 115, preferably positioned symmetrically around the bowl-shaped element 113, at the upper end of the outer rotor element 111. The outer rotor element 111 comprises a plurality of parallel slots 112 extending from the lower end of the annular element 111 which is arranged to face towards the stator 130, and said slots 112 are preferably positioned symmetrically around the bowl-shaped element 113. The outer rotor element 111 further comprises a plurality of recessed surfaces 116 on its outer surface extending between the subsequent slots 112 in an angular direction and a plurality of corrugated surfaces 117 on the lower end of its outer surface extending between the subsequent slots 112 in the angular direction. In the bowl-shaped element 113 a connection element 114 may be arranged to connect to an electrical body.

Figure 5A:
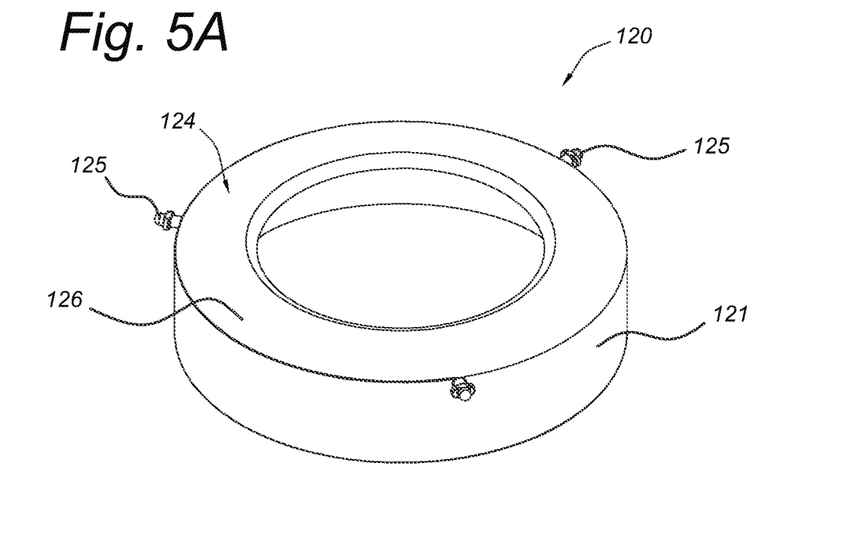
FIG. 5A shows in a perspective view the inner rotor part of the valve shown in FIG. 3.
Figure 5B:
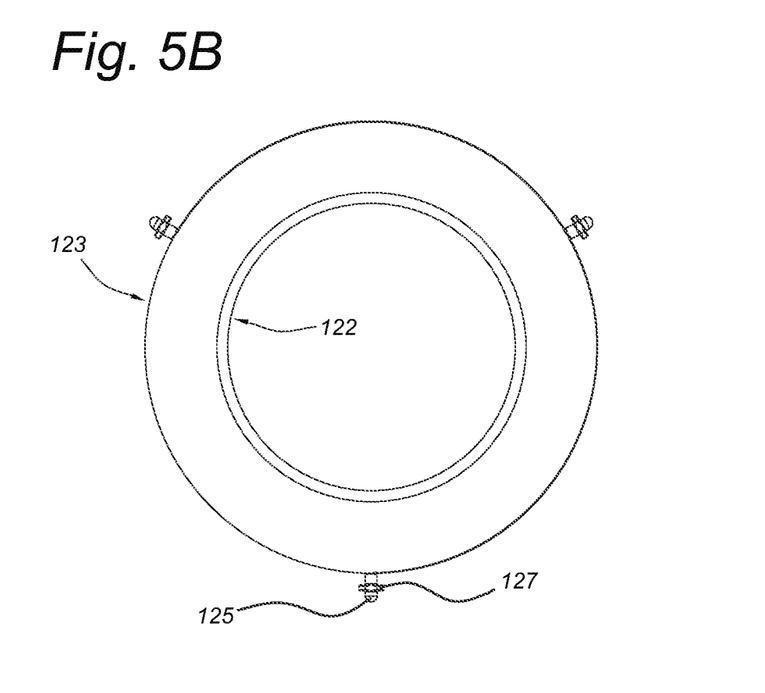
FIG. 5B shows in a top view the inner rotor part of the valve shown in FIG. 5A.

As shown in FIGS. 5A-B, the inner rotor part 120 is formed by an annular inner rotor element 121. At upper end of said inner rotor element 124, which is arranged to face towards the outer rotor part 110 and away from the stator 130, the inner rotor part 120 is provided with a ring-shaped element 126 extending inward from the inner surface 122 of the inner rotor element and with a plurality of protrusions 125 on the outer surface 123, opposite the inner surface 122, of the annular element 121. The plurality of protrusions 125 of the inner rotor part 120 and the plurality of parallel slots 112 of the outer rotor part 110 are positioned at corresponding angular positions in the angular direction, preferably arranged symmetrically around the respective annular element. As such, when the inner rotor part 120 is introduced in the outer rotor part 110, each protrusion 125 extends through a respective slot 112 to a widened section of the protrusion 127 provided outside the outer rotor part 110, wherein the width of the widened section of the protrusion 127 is larger than the width of the respective slot 112. Hence, the protrusion 125 will prevent movement of the inner and outer rotor element 111, 121 relative to each other in a plane perpendicular to the axial direction A, e.g. by translation in the radial direction or by rotation in the angular direction.

Figure 3:
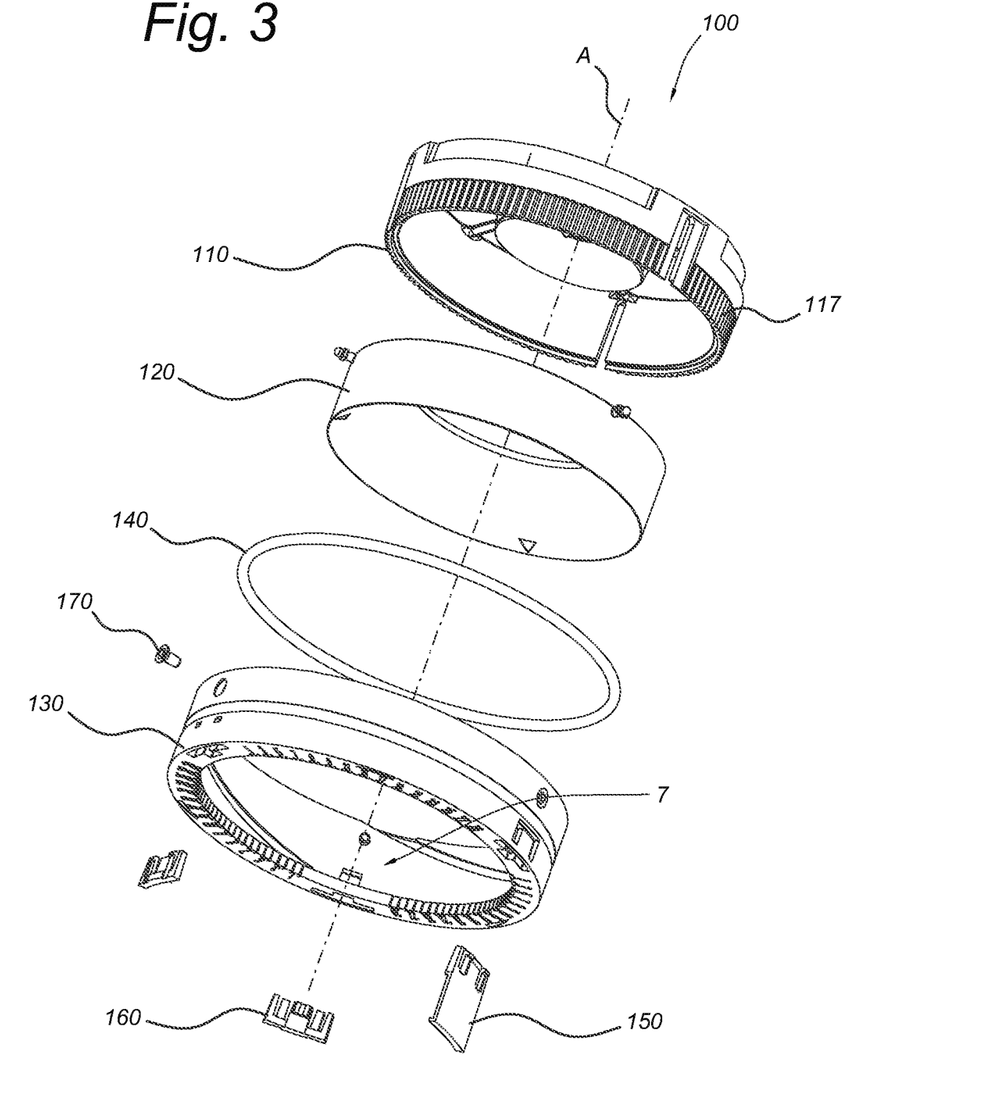
FIG. 3 shows in exploded view of a valve assembly according to an embodiment of the invention.
Figure 6A:
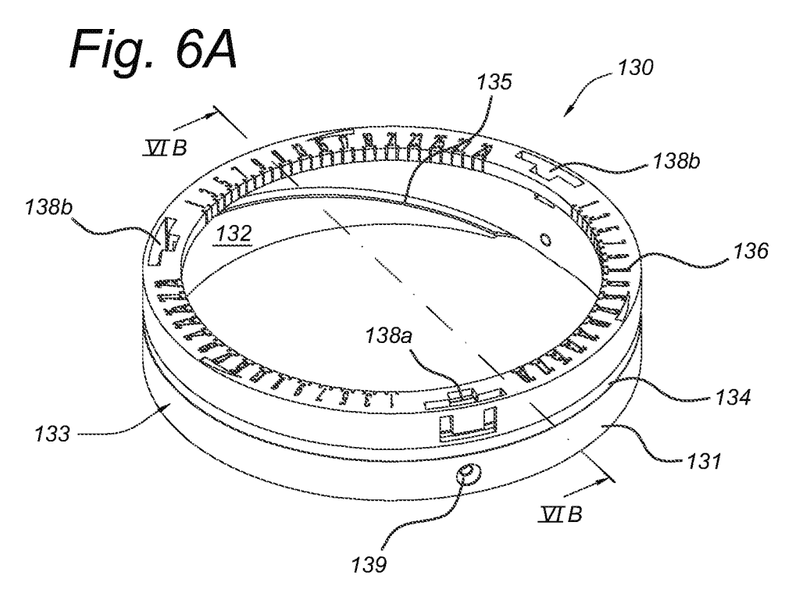
FIG. 6A shows in a perspective view the stator of the valve shown in FIG. 3.
Figure 6B:
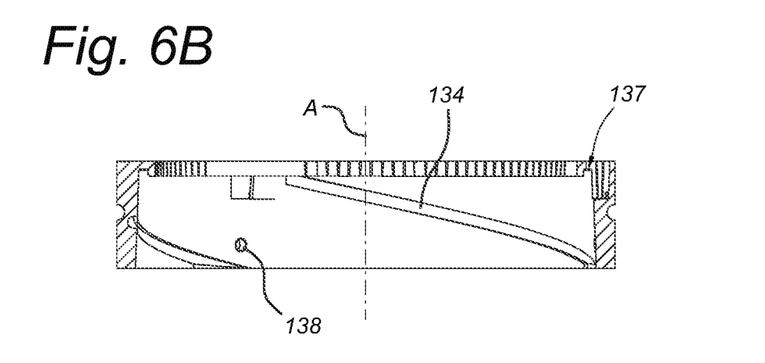
FIG. 6B shows in a cross-sectional view the stator of the valve shown in FIG. 6A.

As shown in FIGS. 6A-B, the stator 130 is formed by an annular stator element 131 in which an outer slot 134 is provided on the outer surface 133 of the stator element 131 to receive the annular coil spring 140, shown in FIG. 3, to mechanically retain the stator 130 in the air duct, and in which at least one inner slot 135 is provided on the inner surface 132 of the stator element 131 to receive and guide the plurality of protrusions 125 of the inner rotor part 120. The at least one inner slot 135 is adapted to guide the plurality of protrusions 125, and thereby axially move the inner rotor part 120, when the plurality of protrusions 125 are rotated around the central axis A. At the lower end of the stator 130, which is arranged to face towards a room of the house, the stator 130 further comprises a ring-shaped element 136. On a lower side of the ring-shaped element 136, the ring-shaped element 136 is provided with visual indications relating to the axial position of the at least one inner slot 135 at a predetermined angular position, and, at the opposite upper side, the ring-shaped element 136 is adapted to receive the lower end of the outer rotor element 111 in an annular recess 137, as shown in FIG. 1.

The stator 130 further comprises openings 138$a$, 138$b$, of respectively a locking mechanism and a ratchet mechanism, extending axially from the lower end of the stator element 131 to allow insertion of a complementary element by a user when installed and extending radially the inner surface 132 to allow interaction between the complementary element and the outer surface of the outer rotor element 111.

By introduction of locking means 150 in the opening 138$a$, the locking means 150 interact with the corrugated surface 117 of the outer rotor part 110 to lock the relative position between the stator 130 and the rotor parts 110, 120. By introduction of ratchet means 160 in the opening 138$b$, the ratchet means 150 interact with the corrugated surface 117 of the outer rotor part 110 to limit the rotational movement between the stator 130 and the rotor parts 110, 120 to clockwise or counterclockwise movement in the angular direction.

The stator element 131 further comprises a plurality of countersunk or counterbored holes 139 on its outer surface to receive a respective screw or the like 170 that extends in a respective recessed surface 116 of the outer rotor element 111 to mechanically retain the outer rotor part 110, and thereby also the inner rotor part 120, inside the annular stator element 131, i.e. in the space defined by the annular stator element 131 and the lower ring 136. The screw 170 and recesses 116 further limit the rotational movement of the outer rotor part 110 in the angular direction.

Next, the operating principle of the display device of the present invention will be described. As mentioned above the valve 10, 100 comprises adjustment means and flow regulating means for regulating the flow or pressure of air flowing through the valve 10, 100.

The adjustment means comprises the bowl-shaped element 113, optionally attached to the proximal end 21, that are rigidly connected to the outer rotor element 111. By turning the bowl-shaped element 113, the position of the valve 10, 100 may be changed towards the closed position or towards the open position depending on the direction of rotation. Turning of the bowl-shaped element 113 causes the outer rotor element 111 to turn in the same direction of rotation, and therewith the protrusions 125 of the inner rotor element 121 present in the slots of the outer rotor element 112.

The protrusions 125, extending through the slots of the outer rotor element 112 and received in the at least one inner slot 135 of the stator element 131, are guided by the at least one inner slot 135 when turning the bowl-shaped element 113. Due to the fact that the at least one inner slot 135 extends in the axial direction A, the axial position of the guided protrusions 125 change relative the stator 130 and the outer rotor part 110. Because of that the axial position of the ring-shaped element 126 of the inner rotor part 110 is changed relative to the bowl-shaped element 113. Hence, the flow or pressure of air flowing through the valve 10, 100 is adjusted because the air passage through the valve is defined by the space between the bowl-shaped element 113 and the ring-shaped element 126.

The flow rate is increased by turning the bowl-shaped element 113 clockwise and the flow rate is decreased by turning the bowl-shaped element 113 clockwise, or vice versa.

In a preferred embodiment, the valve comprises a distal end and a proximal end, wherein said distal end is closer to the air duct than the proximal end. The housing 40 having an outer housing side 41 is adapted to be attached to said air duct and an inner housing side 42, opposite to the outer housing side 41, which is arranged to receive said valve 10, 100. The electrical body 20 is provided within said housing 40, and is adapted to connect a power source to an electrical device, wherein the electrical body 20 comprises a distal end, a proximal end and an outer circumference at the distal end. The valve 10, 100 comprises adjustment means to adjust the position of flow regulating means 113, 126 of the valve 10; 100, wherein the position of the flow regulating means 113, 126 is configured to adjust the size of a gap 50 between the valve 10; 100 and the outer circumference at the distal end of the electrical body 20, regulating a flow or pressure of air flowing through the valve 10; 100, wherein the size of the gap 50 is measured perpendicular to the outer circumference at the distal end of the electrical body as the smallest distance from the distal end of the electrical body 20 to the flow regulating means 113, 126 of the valve 10; 100. The valve can be used to take fresh air in a room or to expel exhaust air from a room. This is advantageous since the user may adjust the valve without the need for disassembling said valve, merely by adjusting the size of the gap by adjusting the position of the flow regulating means. Additional advantageous is that the position of the electrical body 20 does not need to change, as only changing the position of the flow regulating means is adjusted.

Figure 10:
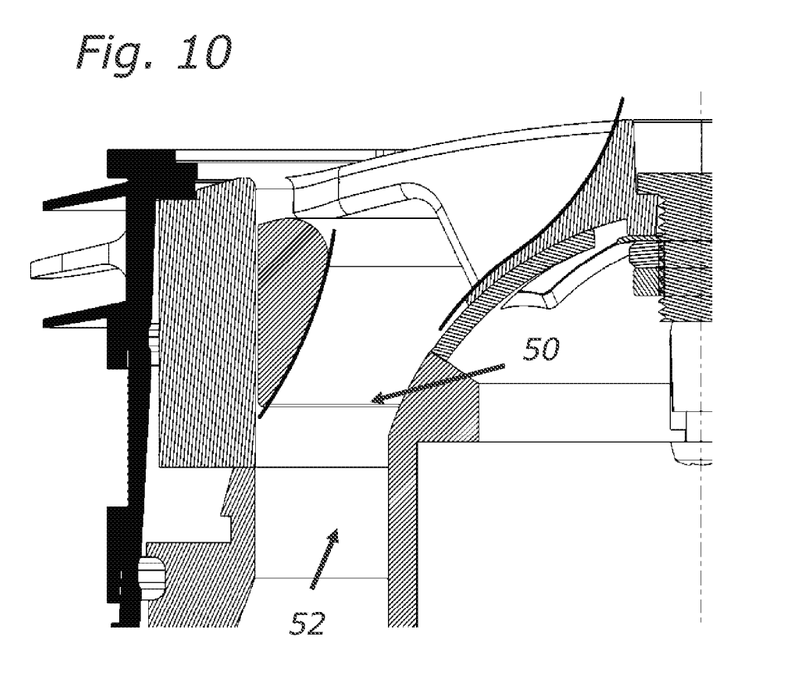
FIG. 10 shows a detail of a cross section of a valve assembly, wherein fluent and continuous curves are indicated, determining the flow of air through the gap between the valve and the outer circumference at the distal end of the electrical body.

In a preferred embodiment, the electrical body 20 is attached at its distal end to the distal end of the valve 10, 100. The outer circumference of each cross-section of the electrical body 20 is determined at its distal end by a fluent and continuous curve for guiding a flow of air through a gap 50 between the valve 10; 100 and the outer circumference at the distal end of the electrical body 20 and along the electrical body 20. The cross section is from the distal end to the proximal end of the electrical body 20. In another embodiment, the electrical body is attached at its distal end to the proximal end of the valve 10, 100. Said fluent and continuous curve of the outer circumference is advantageous in improving the noise of the valve assembly, as compared to for example a non-curvy outer circumference, for example, an outer circumference comprising edges, wherein the flow of air along said outer circumference comprising edges may cause noise due to the non-fluent flow of air, e.g. vortices. FIG. 10 shows in thicker black lines fluent and continuous curves on the valve and the distal part of the valve and the electrical body. In the depicted embodiment the electrical body can be tilted and the fluent and continuous curve of the distal part of the electrical body continues below the fluent and continuous curve of the distal part of the valve.

In a preferred embodiment, the size of the gap 50 between the valve 10; 100 and the outer circumference at the distal end of the electrical body 20 is at least 2% and at most 20% of the diameter of the outer housing side 41, preferably at least 4% and at most 11%. The gap is important since it determines the air flow. As shown in FIG. 8, the air is squeezed at said gap 50, which consequently contributes to and is influential on the flow or pressure of air flowing through the valve 10, 100. Therefore, said electrical body (20) influences and controls the flow or pressure of air flowing through the valve (10; 100). A gap within the given range is sufficient for adjusting the flow or pressure of air flowing through the valve, while maintaining sufficient space for the electrical body 20.

In a preferred embodiment, the electrical body is a luminaire body 20. Alternatively, the electrical body may be a sensor e.g. a smoke detector, or a movement detector.

In a preferred embodiment, the electrical body 20 is adapted to control the ventilation. The electrical body 20 controls the ventilation passively by defining a channel in which the air flow is guided through the valve, or actively by controlling and adjusting the air flow or air pressure e.g. by adjusting the position of the flow regulating means 110, 126 e.g. by rotating and/or directing the electrical body 20. In a preferred embodiment, the electrical body 20 is a body of revolution, wherein the electrical body 20 has a maximum diameter of at least 35% and at most 70% of the diameter of the inner housing side (42), preferably at least 40% and at most 65% and even more preferably at least 50% and at most 60% of the diameter of the inner housing side 42.

Figure 8A:
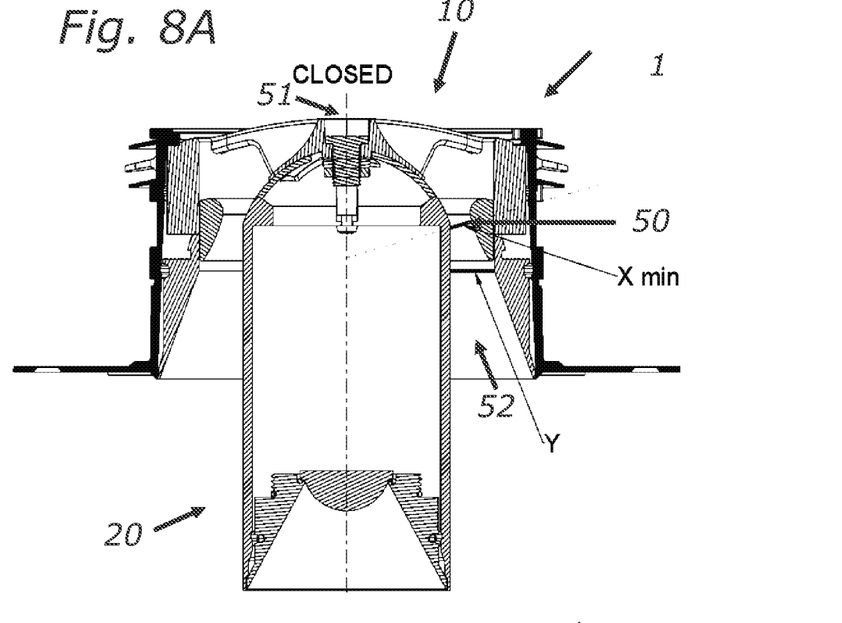
Figure 8B:
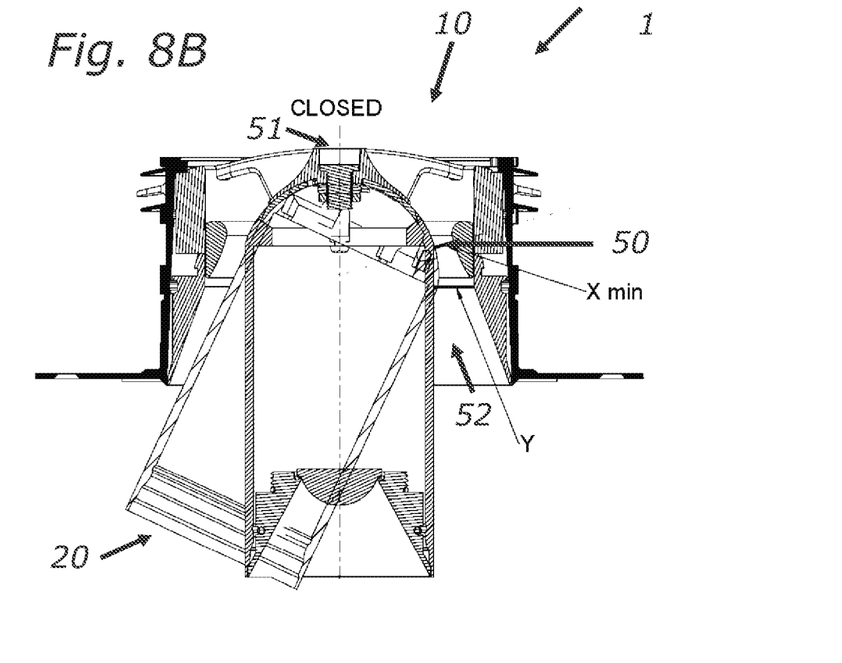
Figure 9A:
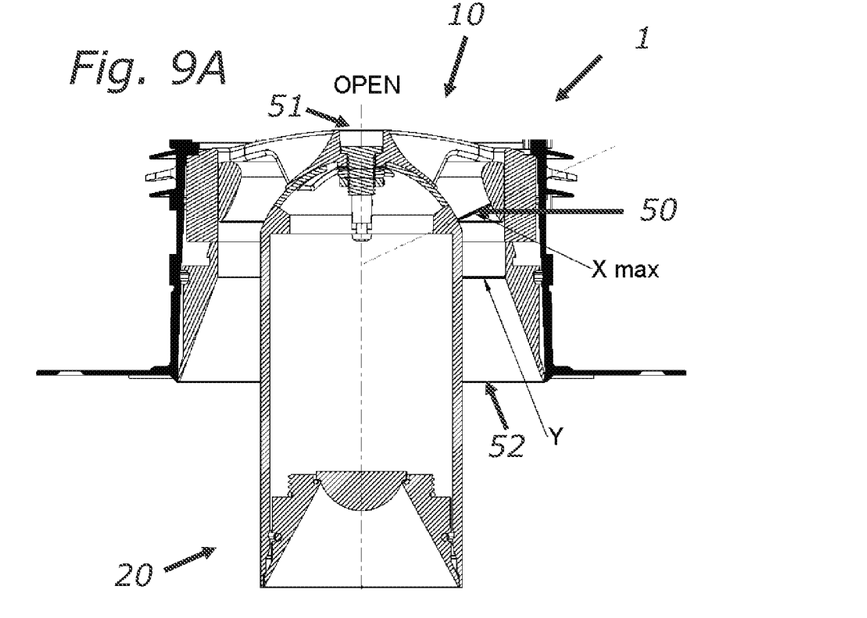
Figure 9B:
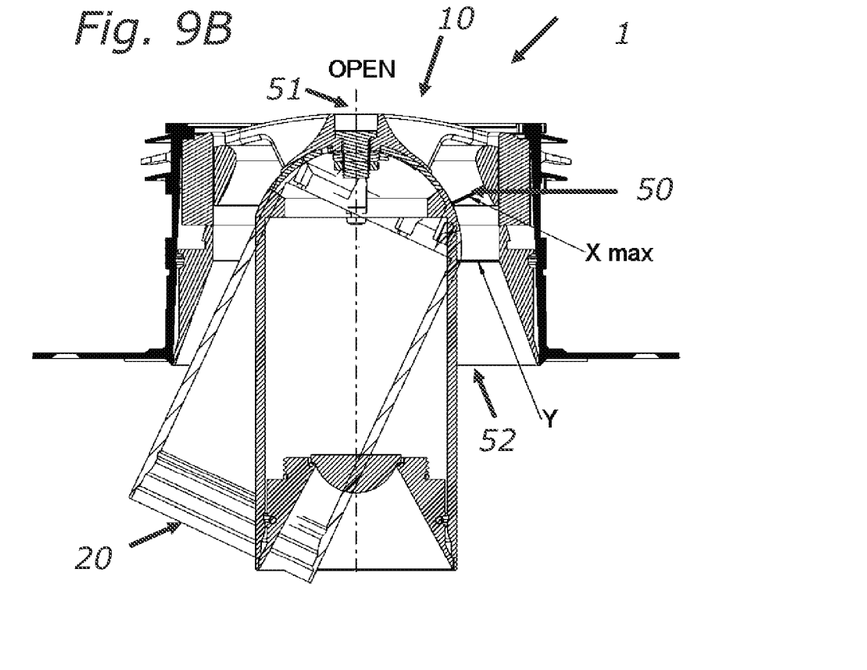

In a preferred embodiment, the electrical body 20 is adapted to be connected to the adjustment means of the valve such that the position of the flow regulating means of the valve 10; 100 is manually adjustable via axial rotation of the electrical body 20. For example, rotation of the electrical body 20 adjusts the valve 10, 100 between an open position, as shown in FIG. 9A and FIG. 9B, and a closed position, as shown in FIG. 8A and FIG. 8B. The flow or pressure of air flowing through the valve 10, 100 is at a maximum value (e.g. high air flow) when the valve 10, 100 is set to the open position, and is at a minimum value (e.g. low or no air flow) when the valve 10, 100 is set to the closed position. Said rotation of the electrical body 20 adjusts the width of the gap 50 between a maximum value (e.g. the open position) and a minimum value (the closed position).

In a preferred embodiment, the gap 50 is between 10.0 mm and 12.0 mm wide at the open position (indicated with X max on FIG. 9), preferably between 10.5 mm and 11.5 mm wide, more preferably around 11 mm wide, most preferably around 10.929 mm wide. The gap 50 is between 5.5 mm and 7.5 mm wide at the closed position (indicated with X min on FIG. 8), preferably between 6 mm and 7 mm wide, more preferably around 6.51 mm wide. In a preferred embodiment, the diameter of the electrical body 20 is between 50 and 70 mm, preferably 59 mm. In a preferred embodiment, the diameter of the outer housing 41 is between 100 and 120 mm, preferably 108 mm.

In a preferred embodiment, the distal end of the electrical body 20 has a fixed position in the housing 40. This is advantageous in having a fixed position for the electrical connection. Such a fixed position is also in agreement with adjusting the regulating means by axial rotation of the electrical body, to avoid damage to the electrical connection while adjusting the regulating means. Additional beneficial is that the electrical connection does not influence the air flow.

In a preferred embodiment, the ratio between the widths of the outer housing 42, to the gap 50, to the electrical body 20, is between 1:0.09:0.5 and 1:0.11:0.6 in the open position, preferably around 1:0.1:0.55, and between 1:0.05:0.5 and 1:0.07:0.6 in the closed position, preferably around 1:0.06:0.55.

In a preferred embodiment, the electrical body 20 comprises at its distal end a joint for tilting the electrical body 20 in at least in one direction, wherein the gap 50 between the valve 10; 100 and the outer circumference at the distal end of the electrical body 20 remains unaltered by tilting. For example, the air flow through the valve 10; 100 remains unaltered by tilting. This can be seen on the FIGS. 8B and 9B. Said joint may preferably be centrally located in the valve 10, 100, for example such that the electrical body 20 is central and symmetrical. Alternatively it may be arranged on the side of the valve with a foldable arm, or in an asymmetrical configuration e.g. tilted electrical body 20.

In a preferred embodiment, the power source is connected to the electrical device via an electrical connection, wherein said electrical connection is preferably provided through a cavity 51 through said joint at the distal end of the electrical body 20. Said connection is preferably provided at a central point of said distal end. Said central point is preferably a fixed point. For example, said fixed point does not move when tilting the electrical body 20, and/or does not rotate when rotating the electrical body 20.

In a preferred embodiment, said distal end is dome-shaped, or semi-circular.

In a preferred embodiment, a discharge flow between 10 and 100 m$^3$/h is achieved. Preferably, between 25 m$^3$/h and 50 m$^3$/h.

In a preferred embodiment, the electrical body is tiltable up to at most 60°, preferably up to at most 45°, even more preferably up to at most 30°. This provides the flexibility for example to project a lighting device in different directions.

In a preferred embodiment, the locking means 150 prevent adjustment of the position of the flow regulating means of the valve 10, 100. For example, by preventing the rotation of the electrical body 20. For example, the locking means 150 may be manually activated or deactivated.

In a preferred embodiment, the valve assembly is adapted for easy cleaning, preferably without disassembling said assembly and without removal of said disassembly from air duct. This is enabled since the passage 52 from the room to the air duct is not obstructed up to the valve 10, 100, for example said passage 52 is easily reachable by the user, wherein e.g. a cleaning brush may be inserted for cleaning purposes. Preferably, the gap 50 in both the open and the closed position allows such cleaning e.g. the gap is always bigger than zero.

In a preferred embodiment, the valve 10, 100 and the electrical body 20 are removable from the housing. This is advantageous for enabling easy cleaning of the air duct. This embodiment is especially beneficial in combination with embodiments comprising a locking means 150, because removing the valve 10, 100 will not have an influence on the position of the flow regulating means of the valve 10, 100. The valve and the electrical body can be placed back after cleaning, without readjusting the flow regulating means of the valve. This embodiment is especially beneficial in combination with previously described embodiments of a valve assembly, wherein the adjustable valve is mechanically retained via an annular coil spring In a preferred embodiment, the housing 40 and the electrical body 20 is configured in a cylindrical configuration, wherein the housing 40 has a diameter larger than the diameter of the electrical body 20. A volume is defined between the two cylinders, in which the air is guided through, preferably continuously. The valve may supply air in one of two directions, depending on the application and the user. The direction may be changed.

In a preferred embodiment, said passage 52 between the two cylinders may be configured long enough, for example between 1 and 10 cm, preferably at least 3 cm, such that the assembly is deep enough inside the ceiling, such that the individual parts of the valve assembly e.g. outer rotor part, inner rotor part, or any possible connections e.g. electrical connection, or the air duct, are preferably invisible, due to the lack of light reflecting from said parts.

In another aspect, the present invention relates to a valve 10, 100 and/or housing 40 and/or electrical body 20 configured for assembly into a valve assembly 1.

In another aspect, the present invention relates to a method for controlling air flow or air pressure in an air duct for ventilation of a building. The method comprises the step of placing a housing 40 having an outer housing side 41 adapted to be attached to said air duct and an inner housing side 42, opposite to the outer housing side 41, in the said air duct. The method further comprises the step of placing a valve 10; 100 in the housing 40. The valve 10; 100 comprises a distal end and a proximal end. Said distal end is closer to the air duct than the proximal end, Said inner housing side 42 of the housing 40 is arranged to receive said valve 10; 100.

The method further comprises the step of providing an electrical body 20 within said housing 40. The electrical body 20 is adapted to connect a power source to an electrical device. The electrical body 20 comprises a distal end and a proximal end. The method further comprises the additional step of regulating the flow or pressure of air flowing through the valve 10; 100 by adjusting the position of flow regulating means 113, 126 of the valve 10; 100, wherein the position of the flow regulating means 113, 126 is configured to adjust the size of the gap 50 between the valve 10; 100 and the outer circumference at the distal end of the electrical body 20, wherein the size of the gap 50 is measured perpendicular to the outer circumference at the distal end of the electrical body as the smallest distance from the distal end of the electrical body 20 to the flow regulating means 113, 126 of the valve 10; 100.

In a preferred embodiment, the electrical body 20 is attached at its distal end to the distal end of the valve 10; 100, wherein an outer circumference of each cross-section of the electrical body 20 is determined at its distal end by a fluent and continuous curve for guiding a flow of air through a gap 50 between the valve 10; 100 and the outer circumference at the distal end of the electrical body 20 and along the electrical body 20, wherein the cross section is from the distal end to the proximal end of the electrical body 20.

In a preferred embodiment, the position of the regulating means 113, 126 is adjusted via axial rotation of the electrical body 20.

In a preferred embodiment, the valve 100 is adapted to adjust the axial position of the inner rotor part 120 relative to the outer rotor part 110, such that the gap 50 is changed, via axial rotation of the electrical body 20.

In a preferred embodiment, the method may further comprise the additional step of engaging a removable locking means 150, adapted to prevent adjustment of the position of the flow regulating means of the valve 10; 100.

In a preferred embodiment, the method may further comprise the additional step of directing the electrical body 20. For example, tilting the electrical body 20.

In another aspect, the present invention relates to a use of a valve assembly (1) or a method for adjusting air flow or air pressure in a mechanical ventilation system.

Other alternatives and equivalent embodiments of the present invention are conceivable within the idea of the invention, as will be clear to the person skilled in the art. The scope of the invention is limited only by the appended claims.

LIST OF REFERENCE SIGNS

1. Valve assembly
10, 100. Valve
20. Luminaire Body
21. Proximal End
22. Distal End
23. Lamp
30. Guide Element
31. Outer Slot of the Guide Element
40. Housing
41. Outer Housing Side
42. Inner Housing Side
50 Gap
51 Cavity
52 Passage
110. Outer Rotor Part
111. Outer Rotor Element
112. Slot of the Outer Rotor Element
113. Bowl-shaped Element
114. Connection Element
115. Spacer
116. Recesses Surface
117. Corrugated Surface
120. Inner Rotor Part
121. Inner Rotor Element
122. Inner Surface of the Inner Rotor Element
123. Outer Surface of the Inner Rotor Element
124. Upper End of the Inner Rotor Element
125. Protrusion
126. Ring-shaped Element
127. Nut
130. Stator
131. Stator Element
132. Inner Surface of the Outer Rotor Element
133. Outer Surface of the Outer Rotor Element
134. Outer Slot
135. Inner Slot
136. Ring-shaped Element with Visual Indications
137. Annular Recess
138A. Opening of the Locking Mechanism
138B. Opening of the Ratcheting Mechanism
139. Countersunk or Counterbored Hole
140, 141. Canted Coil Spring
150. Locking Means of the Locking Mechanism
160. Ratchet Means of the Ratcheting Mechanism
170. Screw
A. Central Axis
B. Luminaire Body Axis

The invention claimed is:

1. Valve assembly for an air duct for ventilation of a building, comprising:
   a valve, wherein the valve comprises a distal end and a proximal end, wherein said distal end is closer to the air duct than the proximal end;
   a housing having an outer housing side adapted to be attached to said air duct and an inner housing side, opposite to the outer housing side, which is arranged to receive said valve; and
   an electrical body provided within said housing, and adapted to connect a power source to an electrical device, wherein the electrical body comprises a distal end, a proximal end and an outer circumference at the distal end;
   characterized in that, the electrical body is rotatable around its longitudinal axis, and thereby adjusts the size of a gap between the valve and the outer circumference at the distal end of the electrical body, thereby regulating a flow or pressure of air flowing through the valve, wherein the size of the gap is measured perpendicular to the outer circumference at the distal end of the electrical body as the smallest distance from the distal end of the electrical body to the valve.

2. The valve assembly according to claim 1, wherein the electrical body is attached at its distal end to the distal end of the valve, wherein the outer circumference of each cross-section of the electrical body is determined at its distal end by a fluent and continuous curve for guiding the flow of air through the gap between the valve and the outer circumference at the distal end of the electrical body and along the electrical body, wherein the cross section is from the distal end to the proximal end of the electrical body.

3. The valve assembly according to claim 1, wherein the size of the gap between the valve and the outer circumference at the distal end of the electrical body is at least 2% and at most 20% of the diameter of the outer housing side, preferably at least 4% and at most 11%.

4. The valve assembly according to claim 1, wherein the distal end of the electrical body has a fixed position in the housing.

5. The valve assembly according to claim 1, wherein the electrical body is a body of revolution, wherein the electrical body has a maximum diameter of at least 35% and at most 70% of the diameter of the inner housing side.

6. The valve assembly according to claim 1, wherein the electrical body comprises at its distal end a joint for tilting the electrical body in at least in one direction, wherein the gap between the valve and the outer circumference at the distal end of the electrical body remains unaltered by tilting.

7. The valve assembly according to claim 1, wherein the electrical body is configured as a luminaire body that is adapted to receive and connect to a light source, e.g. a LED, to provide illumination.

8. The valve assembly according to claim 1, further comprising a removable lock adapted to prevent axial rotation of the electrical body.

9. The valve and/or housing and/or electrical body configured for assembly into a valve assembly according to claim 1.

10. Use of a valve assembly according to claim 1 for adjusting air flow or air pressure in a mechanical ventilation system.

11. Valve assembly according to claim 1, wherein the valve comprises a stator, an inner rotor part and an outer rotor part, wherein the stator comprises an annular stator element, the outer rotor part provided in a space defined by the annular stator element, and the inner rotor part enclosed between, and connected to, the stator and the outer rotor part, and wherein a ring-shaped element extends inwards from an inner surface of the inner rotor part and the size of the gap is measured as the smallest distance from the distal end of the electrical body to the ring-shaped element.

12. Method for controlling air flow or air pressure in an air duct for ventilation of a building, comprising:
    placing a housing having an outer housing side adapted to be attached to said air duct and an inner housing side, opposite to the outer housing side, in said air duct;
    placing a valve in said housing, wherein the valve comprises a distal end and a proximal end, wherein said distal end is closer to the air duct than the proximal end and wherein said inner housing side of the housing is arranged to receive said valve;
    providing an electrical body within said housing, wherein the electrical body is adapted to connect a power source to an electrical device and wherein the electrical body comprises a distal end, a proximal end and an outer circumference at the distal end;
    characterized in that, the method comprises the additional step of regulating the flow or pressure of air flowing through the valve by rotating the electrical body around its longitudinal axis, thereby adjusting the size of the gap between the valve and the outer circumference at the distal end of the electrical body, wherein the size of the gap is measured perpendicular to the outer circumference at the distal end of the electrical body as the smallest distance from the distal end of the electrical body to the valve.

13. The method according to claim 12, wherein the electrical body is attached at its distal end to the distal end of the valve, wherein an outer circumference of each cross-section of the electrical body is determined at its distal end by a fluent and continuous curve for guiding a flow of air through a gap between the valve and the outer circumference at the distal end of the electrical body and along the electrical body, wherein the cross section is from the distal end to the proximal end of the electrical body.

14. The method according to claim 12, wherein the method comprises the additional step of engaging a lock adapted to prevent adjustment of the position of the electrical body.

15. The method according to claim 12, wherein the method comprises the additional step of directing the electrical body.

16. A method according to claim 12 for adjusting air flow or air pressure in a mechanical ventilation system.

* * * * *